United States Patent [19]

Frank et al.

[11] 3,829,757

[45] Aug. 13, 1974

[54] SYSTEM FOR CONTROLLING THE FREQUENCY OF AN ALTERNATING CURRENT CONVERTER IN RESPONSE TO LOAD CHANGES

[75] Inventors: Hermann Frank, Sulzbach/Taunus; Rudolf Huber, Bobingen, both of Germany

[73] Assignee: Farbwerke Hoechst Aktiengesellschaft vormals Meister Lucius & Bruning, Frankfurt/am Main-Hoechst, Germany

[22] Filed: Jan. 31, 1973

[21] Appl. No.: 326,557

Related U.S. Application Data

[63] Continuation-in-part of Ser. No. 162,979, July 15, 1971.

[30] Foreign Application Priority Data
July 18, 1970 Germany.............................. 2035811

[52] U.S. Cl.................... 321/18, 318/175, 318/231, 318/445
[51] Int. Cl. .......................................... H02m 7/00
[58] Field of Search ...... 321/16, 18, 45 R; 318/171, 318/231, 341, 445; 307/87

[56] References Cited
UNITED STATES PATENTS
3,388,305   6/1968   Smith................................... 318/175
3,506,907   4/1970   Porterfield et al. ................ 321/45 R Primary Examiner—William M. Shoop, Jr.
Attorney, Agent, or Firm—Curtis, Morris & Safford

[57] ABSTRACT

Alternating current having a selected frequency is produced by a converter to operate a synchronous motor at a desired speed. The frequency of the alternating current is determined by an accumulating circuit that supplies synchronizing impulses to the converter at a rate determined by the setting of the accumulating circuit and in response to a pilot signal. During failure of power to run the converter, a trigger generator responsive to voltage from the decelerating motor changes the control setting of the circuit so that, upon restoration of power, synchronizing pulses will be produced at a lower repetition rate, causing the frequency of alternating current from the converter to be commensurate with the reduced speed of the motor.

8 Claims, 1 Drawing Figure

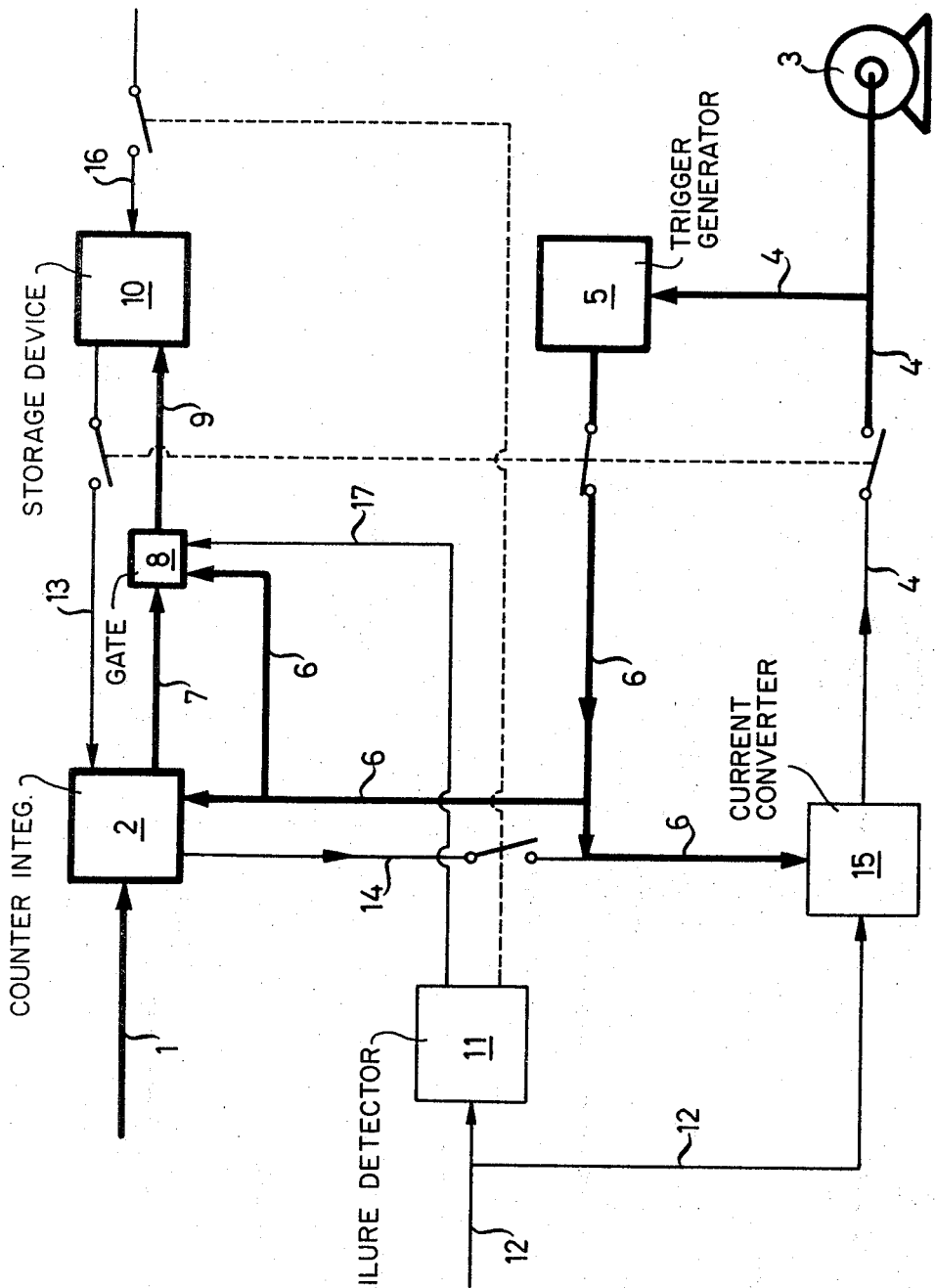

SYSTEM FOR CONTROLLING THE FREQUENCY OF AN ALTERNATING CURRENT CONVERTER IN RESPONSE TO LOAD CHANGES

This is a continuation-in-part of application, Ser. No. 162,979 filed July 15, 1971.

This invention relates to controlling synchronizing signals applied to an alternating current converter after the main power has been turned off so that, if the power is turned back on after a short time, a motor normally operated synchronously from that alternating current can immediately be supplied with current at a frequency that corresponds to the speed to which the motor has slowed down.

Synchronous electric motors are built to operate at a steady speed determined by the frequency of an alternating current power source. If the power is to be derived from an alternating current power line but the desired speed is not commensurate with the line frequency, a current converter is provided to be operated by the incoming power and to generate an alternating current having a suitable frequency.

When there is a failure of the main incoming power, the converter can no longer continue to operate and any synchronous motor connected to it will start to slow down for lack of energizing current. If the failure is of relatively short duration, resumption of incoming power will cause the converter to resume the supply of alternating current to the motor, but since the latter has slowed down during the absence of power, the frequency of the alternating current would be incorrect, and very likely the phase of the current would also be incorrect. The synchronous motor can be brought back into synchronization with the output of the current converter by allowing the motor to accelerate from whatever asynchronous speed it had reached. However, such asynchronous operation causes considerable acceleration and speed variation of the motor, and these effects are undesirable, particularly if the motor is used to operate a machine for drawing filaments of synthetic fiber materials. In such machines, the speed variations result in variations in the tension in the filaments and can lead to breakage of the filaments. Moreover, the additional power required during acceleration means that it is necessary to provide additional power capability in the current converter to avoid its being damaged as a result of overloading.

It is one object of the present invention to avoid the disadvantages of asynchronous operation of a synchronous motor during such occasions.

In accordance with one embodiment of the present invention, the operation of a current converter is controlled by an accumulating circuit in the form of a counter which, in turn, is actuated by a relatively high frequency pilot signal. The counter is set so that it counts a certain number of impulses of the pilot signal and then generates a synchronizing signal to be applied to the current converter. The number of impulses counted between each signal applied to the converter is determined by the setting of the counter, and the setting is, in turn, controlled by a storage device.

When the incoming power to the converter fails, the current converter can no longer supply power to operate a synchronous motor connected to it. Without power from the converter the motor begins to slow down and, in effect, it becomes a generator operating under no-load conditions. The counter is automatically disconnected from the current converter when the power fails but instead, a trigger generator circuit connected to the free-running motor to be controlled by the voltage generated by the motor, is connected to the current converter and supplies the same sort of pulses as the counter but at a frequency determined by the decelerating motor. The signals thus are continuously reduced in frequency and are also applied to the counter and, by way of a gate, which is activated during power failure, to the storage device. As a result of the signals from the trigger generator, when the power returns and the current converter can resume operation, the counter will be controlled to count a different, and greater, number of pilot impulses for each signal applied to the converter. Therefore, at the instant of resumption of incoming power, the converter will begin to generate current to drive the motor at its decelerated speed. Various types of means can be provided to actuate the storage device to bring the counter, and therefore the operation of the current converter, back to the desired operating rate slowly enough so that the motor can be accelerated smoothly without having to operate at a substantial asynchronous speed.

As an alternative, the accumulating circuit may be an integrator and the pulse signal may be a constant direct voltage.

The invention will be described in greater detail with reference to the single FIGURE, which is a block diagram of a system for controlling the frequency of alternating current generated by a source in accordance with the invention.

In the drawing, a connector 1 is provided to make connection with a source of a pilot signal. This signal is applied by way of the conductor to an accumulating circuit 2, which may be a counter, or in some cases, an integrator. The circuit 2 will be referred to simply as a counter in the description of this embodiment. Normally, the pilot signal is a pulse wave and the counter 2 counts each pulse in the wave and provides an output pulse after a pre-determined count. The ultimate purpose of counting the pulses is to control the operation of a synchronous motor 3, which may be a three-phase motor that is connected to a power line 4. The motor is also connected by way of the power line 4 to a trigger-generating circuit 5 which generates the same kind of impulses as the counter 2 and, during failure of the main incoming power, supplies them via conductors 6 to several sections of the system, including the counter 2. An output, which represents the total count by the counter 2, is supplied by way of a conductor 7 to a gate circuit 8. The conductor 6 is also connected to the gate circuit 8 and the output of the gate circuit is connected by way of a conductor 9 to a storage device 10 that records the total for the counter 2 and furnishes a standard with which later counts can be compared.

A failure detector 11 is connected to an incoming power line 12 from which the main power for the motor 3 is obtained. The failure detector 11 monitors the power line 12 and actuates certain switches and components within this system in the event of a power failure on the line 12. These switches include a switch in series with the power line 4 that supplies power to the motor 3, the main branch of the conductor 6 over which impulses are transmitted from the trigger generator 5, a conductor 13 by which the total recorded in the storage device 10 is connected to control the counter 2, and a conductor 14 over which output pulses from the counter 2 are connected to a current converter 15 that generates the necessary alternating current to drive the motor 3. The failure detector 11 also controls a switch in series with a line 16 by which adjusting signals may be supplied to the storage device 10. The switches controlled by the failure detector 11 are shown in the condition that would exist after a power failure on the line 12. In this condition, only the switch in series with the conductor 6 is closed and the remainder of the switches are open. The failure detector 11 is also connected by way of a conductor 17 to control the gate circuit 8 directly.

In normal operation when there is no power failure, the switches in series with the conductors 4, 13, 14 and 16 are closed and the switch in series with the conductor 6 is open. Under such conditions the counter 2 counts the impulses of the incoming pilot wave received from the conductor 1 until it reaches a total as determined by the storage device 10. Upon reaching that total, the counter 2 transmits a pulse by way of the line 14 to control the operation of the current converter 15. It is to be understood that the output current of the current converter 15 need not be sinusoidal but may, instead, be in the form of a step wave that alternates between positive and negative values in a series of steps and changes from step to step in response to an impulse signal received from the counter 2 by way of the conductor 14. Moreover, the current converter 15 may produce a three-phase current, as is usually required if the motor 3 has a high power output.

The frequency of the current output of the current converter 15 is a fraction of the frequency of the pilot signal supplied to the counter 2 and this fraction is controlled by the frequency of the pilot signal and by the number of impulses of the pilot wave that have to be counted by the counter 2 in order to produce an output pulse over the conductor 14. After each such output pulse, the counter is returned to a base value, such as zero, and begins counting again. The number of counts between successive impulses from the counter 2 is determined by the value retained in the storage device 10 and communicated to the counter 2 by way of the conductor 13.

When the main source of power over the line 12 is interrupted, the current converter 15, which is operated by this main power, can no longer continue to generate current to operate the motor 3. The failure detector 11 responds to failure of the main power by actuating the switches to the condition shown, and although the components of the system other than the high current part of the converter 15 may be supplied with their relatively limited power needs from another, uninterrupted source, the interruption of current to the motor 3 will cause the latter to begin slowing down.

It is well known that a motor also produces an output voltage when its rotor is turning. Since the rotor of the motor 3 continues to turn after power is interrupted, a voltage is generated by the motor and is supplied by way of the conductor 4 to the trigger circuit 5. This trigger circuit produces impulses of the same type as the counter 2 and these pulses are supplied to the converter 15 to replace the pulses from the counter 2. The interruption of the main current through the converter 15 does not necessarily interrupt the synchronizing section of the converter, and it is desirable to continue to supply impulses so that the converter will return to operation in the proper phase upon resumption of the main power by way of the line 12, if the power failure is of relatively short duration and is finished before the motor coasts completely to a stop.

The pulses from the trigger-generator 5 are also supplied to the counter 2 so that the counting operation is stopped upon receipt of each of the impulses and the total is transferred by way of the conductor 7 to the gate 8. The gate 8 is actuated by the failure detector 11 by way of the conductor 17 and is arranged so that at least two pulses are required from the trigger-generator 5 before the total supplied by way of the conductor 7 can be transmitted through the gate 8 to the storage device 10 to change its effective setting. The reason that two pulses are required is that, when the motor 3 starts to act as a generator, the first pulse produced by the trigger-generator 5 will occur too soon after the last pulse from the counter 2 and thus must not be used to control the setting of the storage device 10. This first pulse is used to return the counter to its base value. The second such pulse from the trigger-generator 5 and all subsequent pulses may be transmitted through to the storage device 10 to control it.

As the motor 3 slows down, the pulses produced by the trigger-generator 5 will be spaced farther and farther apart and this spacing will be stored in the storage device 10 in the form of a revised total for the counter 2. As a result, when the power is again available from the line 12, the counter 2 will be required to count a larger number of the pilot signal pulses received from the conductor 1 before generating another impulse over the line 14 to actuate the converter 15. This increased time between successive impulses applied to synchronize the converter 15 causes the converter to take a correspondingly longer time to generate one cycle of the alternating current to supply the motor 3. This is equivalent to saying that the frequency of the alternating current generated by the current converter 15 is reduced, and furthermore, is reduced to a value determined by the spacing between pulses from the trigger-generator 5 immediately preceding the resumption of power. Thus, the frequency of the alternating current from the converter 15 is the proper frequency to operate the motor 3 synchronously at the same speed to which it has decelerated while the main power was interrupted.

In order to restore the motor 3 to its original rate of rotation, a succession of diminishing values may be entered into the storage device 10 by way of the conductor 16 until the stored value corresponds to the desired rate of rotation of the motor. The rate of change of the stored value is such that the motor 3 accelerates smoothly and is always substantially in synchronism with the increasing frequency of the alternating current supplied by the current converter 15.

Although the invention has been described with respect to a digital system employing a pilot signal in the form of an oscillation of fixed frequency operating the accumulating circuit 2, the apparatus could be constructed to operate as an analog device, for example, by making the accumulating circuit 2 an integrating circuit and making the pilot signal a constant direct voltage. Furthermore, the operation described above with reference to a power failure over the line 12 may be employed during normal switching off of the system so that when the system is turned back on, the motor 3 may be rapidly brought into synchronism with respect to the impulses generated by the accumulating circuit 2 and as controlling the operation of the converter 15. Thereafter, the motor may be accelerated in a controlled manner and in response to successive values entered into the storage device 10. Undesirable high acceleration and loading of the current converter 15 is avoided in this way.

As a further modification, the system of this invention can also be used to synchronize an oscillator which is connected in the place of the motor 3. In this event, some simplifications of the circuit may be possible.

What is claimed is:

1. A system for producing alternating current of a controlled frequency, said system comprising:
   a converter connected to a source of power and comprising a generator synchronized by a synchronizing signal to generate the alternating current at said frequency;
   a load for said generator;
   accumulating means to receive a pilot signal and to produce said synchronizing signal in response to accumulation of said pilot signal to a limiting value;
   control means to control said accumulating means to determine the length of time between successive ones of said synchronizing signals;
   generating means controlled by said load to generate a second synchronizing signal for said generator at least during intervals of failure of power from said source; and
   means connecting said accumulating means to said control means to adjust the limiting value of said accumulating means during power failure, whereby said accumulating means will accumulate said pilot signal to the new limiting value and upon restoration of power hereby will synchronize the frequency of the alternating current from said generator to a value commensurate with the adjusted limiting value.

2. The system of claim 1 in which said accumulating means is a counter and said pilot signal is an oscillatory signal and said counter counts the oscillations of said pilot signal to said limiting value.

3. The system of claim 2 in which said third means comprises storage means to store a count value.

4. The system of claim 3 in which said second synchronizing signal is a series of pulses and said means connecting said second synchronizing signal to adjust the limiting value of said accumulating means comprises a gate circuit connecting said counter to said storage means.

5. The system of claim 4 in which said means connecting said accumulating means to said storage means only allows the count of the accumulating means to the storage means to pass at the second and subsequent of said second synchronizing signal pulses.

6. The system of claim 1 comprising, in addition, a failure detector connected to detect the failure of power applied to said generator, and comprising:
   first switching means connected to said accumulating means to disconnect said accumulating means from said means to receive a synchronizing signal during the intervals of failure of power; and
   second switching means disconnecting said converter from said load during power failure.

7. The system of claim 5 comprising additional switching means connecting said third means to said accumulating means, said additional switching means being connected to said failure detector to be controlled thereby to open-circuit said additional switching means during the intervals of power failure.

8. The system of claim 1 in which said load is a synchronous motor.

* * * * *